(12) United States Patent
Bunker (10) Patent No.: US 10,612,389 B2
(45) Date of Patent: Apr. 7, 2020

(54) ENGINE COMPONENT WITH POROUS SECTION (71) Applicant: General Electric Company, Schenectady, NY (US)

(72) Inventor: Ronald Scott Bunker, Placitas, NM (US)

(73) Assignee: General Electric Company, Schenectady, NY (US)

(*) Notice: Subject to any disclaimer, the term of this patent is extended or adjusted under 35 U.S.C. 154(b) by 868 days.

(21) Appl. No.: 15/238,277

(22) Filed: Aug. 16, 2016

(65) Prior Publication Data
US 2018/0051569 A1 Feb. 22, 2018

(51) Int. Cl.
F01D 5/18 (2006.01)
F28F 13/00 (2006.01)
F28D 1/02 (2006.01)
F01D 5/14 (2006.01)
F01D 9/02 (2006.01)
F01D 25/12 (2006.01)
F23R 3/00 (2006.01)
F23R 3/06 (2006.01)
F28D 21/00 (2006.01)

(52) U.S. Cl.
CPC ............ F01D 5/186 (2013.01); F01D 5/147 (2013.01); F01D 5/183 (2013.01); F01D 5/187 (2013.01); F01D 9/02 (2013.01); F01D 25/12 (2013.01); F23R 3/002 (2013.01); F23R 3/06 (2013.01); F28D 1/0246 (2013.01); F28F 13/003 (2013.01); F05D 2220/323 (2013.01); F05D 2240/35 (2013.01); F05D 2260/202 (2013.01); F05D 2260/203 (2013.01); F05D 2260/2212 (2013.01); F05D 2300/514 (2013.01); F05D 2300/612 (2013.01); F28D 2021/0021 (2013.01); F28D 2021/0026 (2013.01); Y02T 50/671 (2013.01); Y02T 50/676 (2013.01)

(58) Field of Classification Search
None
See application file for complete search history.

(56) References Cited

U.S. PATENT DOCUMENTS 3,067,982 A * 12/1962 Wheeler, Jr. ............ B23P 15/04
29/889.72
5,363,645 A 11/1994 Pellet
(Continued)

FOREIGN PATENT DOCUMENTS

EP 1 623 776 A2 2/2006
EP 1 847 696 A1 10/2007
(Continued)

OTHER PUBLICATIONS

International Search Report and Written Opinion issued in connection with corresponding PCT Application No. PCT/US2017/043239 dated Oct. 5, 2017.

Primary Examiner — Kayla Mccaffrey
(74) Attorney, Agent, or Firm — McGarry Bair PC (57) ABSTRACT An apparatus and method for cooling an engine component such as a turbine engine airfoil, including a wall bounding an interior extending axially between a leading edge and a trailing edge and radially between a root and a tip. A cooling circuit it located within the interior of the airfoil can include a porous section having a porosity permitting a volume of fluid, such as air, to pass through the porous section.

19 Claims, 8 Drawing Sheets

(56) References Cited

U.S. PATENT DOCUMENTS

| | | | | |
|---|---|---|---|---|
| 5,641,014 A | | 6/1997 | O'Connor et al. | |
| 5,690,473 A | * | 11/1997 | Kercher | F01D 5/183 |
| | | | | 415/115 |
| 5,720,431 A | * | 2/1998 | Sellers | F01D 5/186 |
| | | | | 416/97 R |
| 5,810,552 A | | 9/1998 | Frasier | |
| 6,255,000 B1 | | 7/2001 | O'Connor et al. | |
| 6,375,425 B1 | | 4/2002 | Lee et al. | |
| 6,443,700 B1 | * | 9/2002 | Grylls | F01D 5/182 |
| | | | | 416/229 R |
| 6,461,107 B1 | | 10/2002 | Lee et al. | |
| 6,499,949 B2 | | 12/2002 | Schafrik et al. | |
| 6,551,061 B2 | | 4/2003 | Darolia et al. | |
| 6,617,003 B1 | | 9/2003 | Lee et al. | |
| 6,637,500 B2 | | 10/2003 | Shah et al. | |
| 6,905,302 B2 | | 6/2005 | Lee et al. | |
| 7,500,828 B2 | * | 3/2009 | Landis | F01D 5/147 |
| | | | | 416/1 |
| 7,513,744 B2 | | 4/2009 | Cunha et al. | |
| 7,658,590 B1 | | 2/2010 | Spanks | |
| 8,047,001 B2 | * | 11/2011 | Beeck | F01D 5/18 |
| | | | | 415/116 |
| 8,387,245 B2 | | 3/2013 | Bunker et al. | |
| 8,499,566 B2 | | 8/2013 | Lacy et al. | |
| 8,528,208 B2 | | 9/2013 | Rebak et al. | |
| 8,575,513 B2 | | 11/2013 | Abdo et al. | |
| 8,673,397 B2 | | 3/2014 | Bunker et al. | |
| 8,727,727 B2 | | 5/2014 | Bunker et al. | |
| 8,753,071 B2 | | 6/2014 | Bunker | |
| 8,815,371 B2 | | 8/2014 | Arrell et al. | |
| 8,974,859 B2 | | 3/2015 | Bunker | |
| 9,003,657 B2 | | 4/2015 | Bunker et al. | |
| 2012/0199334 A1 | | 8/2012 | Maurer et al. | |
| 2014/0027102 A1 | | 1/2014 | Antel, Jr. et al. | |
| 2014/0321994 A1 | | 10/2014 | Brzek et al. | |
| 2015/0064019 A1 | | 3/2015 | Lacy et al. | |
| 2015/0321289 A1 | | 11/2015 | Bruck et al. | |
| 2015/0322800 A1 | * | 11/2015 | Crosatti | B22F 5/04 |
| | | | | 416/95 |

FOREIGN PATENT DOCUMENTS

| | | |
|---|---|---|
| EP | 2 949 634 A1 | 12/2015 |
| GB | 778672 A | 7/1957 |
| GB | 1 427 915 A | 3/1976 |

* cited by examiner

ENGINE COMPONENT WITH POROUS SECTION

BACKGROUND OF THE INVENTION

Turbine engines, and particularly gas or combustion turbine engines, are rotary engines that extract energy from a flow of combusted gases passing through the engine onto a multitude of rotating turbine blades.

Turbine engines for aircraft, such as gas turbine engines, are often designed to operate at high temperatures to maximize engine efficiency, so cooling of certain engine components, such as the high-pressure turbine and the low-pressure turbine, can be beneficial. Typically, cooling is accomplished by ducting cooler air from the high and/or low-pressure compressors to the engine components that require cooling. Temperatures in the high-pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine components, such as airfoils, can include one or more interior cooling circuits for routing the cooling air through the airfoil to cool different portions of the airfoil, and can include dedicated cooling circuits for cooling different portions of the airfoil, such as the leading edge, trailing edge, or tip.

BRIEF DESCRIPTION OF THE INVENTION

In one aspect, embodiments of the invention relate to an airfoil for a turbine engine. The airfoil includes a wall defining a pressure side and a suction side extending axially between a leading edge and a trailing edge defining a chord-wise direction and extending radially between a root and a tip defining a span-wise direction, and defining an interior having a cooling surface facing the interior. A cooling circuit is located within the airfoil for and having a cooling passage extending in the span-wise direction. At least one flow augmentation structure is disposed on the inner surface within the cooling passage to augment the flow of cooling fluid. At least one porous section is defined within the wall along the cooling passage at the at least one flow augmentation structure.

In another aspect, embodiments of the invention relate to a component for a turbine engine, which generates a hot gas flow and provides a cooling fluid flow. The component includes a wall separating the hot gas flow and the cooling fluid flow, and having a hot surface along with the hot gas flow and a cooling surface facing the cooling fluid flow. A cooling circuit is located within the component and has a cooling passage at least partially defined by the wall and forms at least a portion of the cooling circuit. At least one flow augmentation structure is disposed on the cooling surface of the wall within the cooling passage to augment the cooling fluid flow passing through the cooling circuit. At least one porous section is defined within the wall along the cooling passage at the at least one flow augmentation structure.

In yet another aspect, embodiments of the invention relate to a method of cooling an airfoil for a turbine engine. The method includes (1) passing a flow of cooling fluid into a cooling circuit within the airfoil; (2) increasing the turbulence of the flow by passing the cooling fluid over at least one flow augmentation structure; and (3) exhausting at least a portion of the cooling fluid flow through a porous section in a wall of the airfoil adjacent the at least one flow augmentation structure.

DESCRIPTION OF EMBODIMENTS OF THE INVENTION

The described embodiments of the present invention are directed to a component for a turbine engine. For purposes of illustration, the present invention will be described with respect to an airfoil for an aircraft gas turbine engine. It will be understood, however, that the invention is not so limited and may have general applicability within an engine, including compressors, as well as in non-aircraft applications, such as other mobile applications and non-mobile industrial, commercial, and residential applications. Additionally, the aspects will have applicability outside of an airfoil, and can extend to any engine component requiring cooling, such as a blade, vane, shroud, or a combustion liner in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
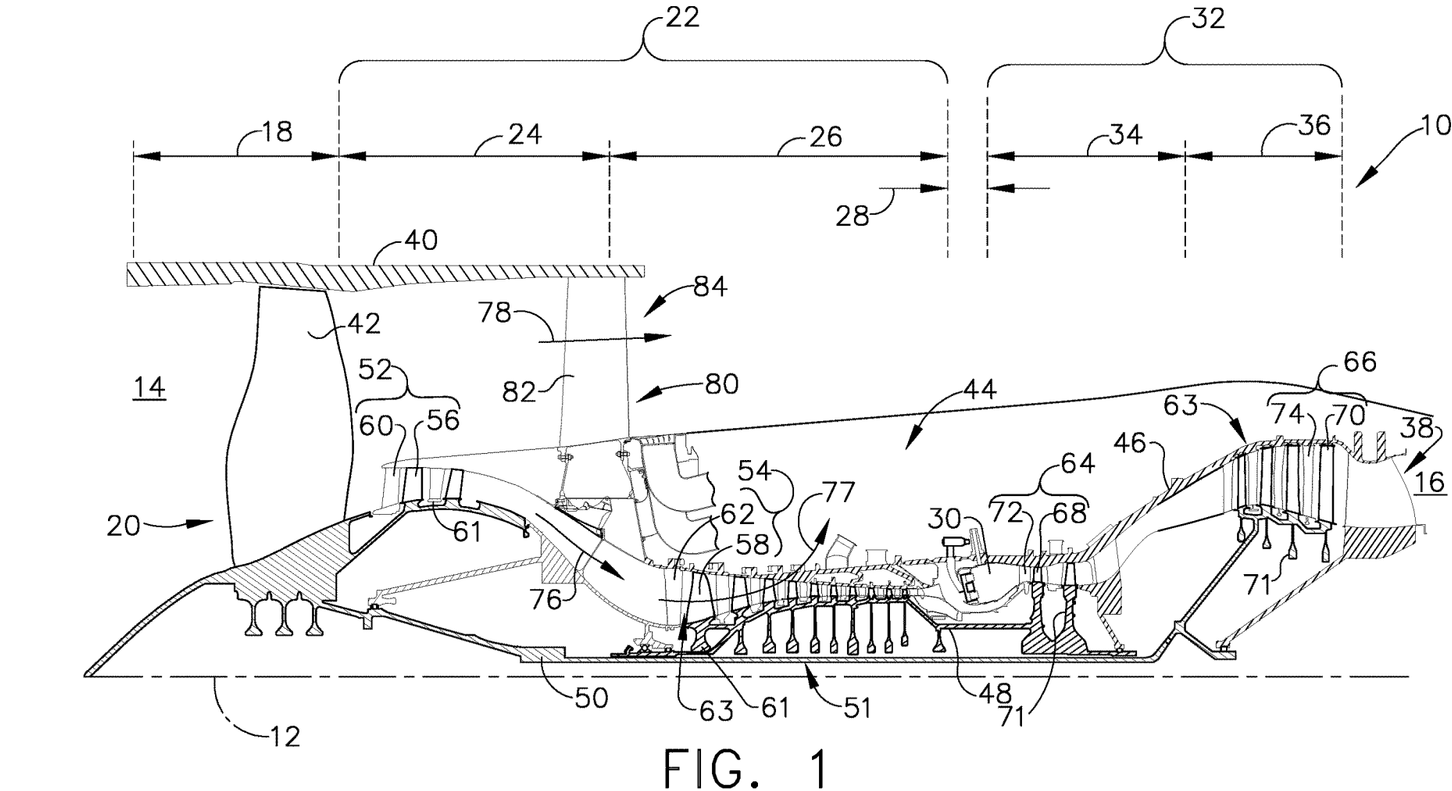
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
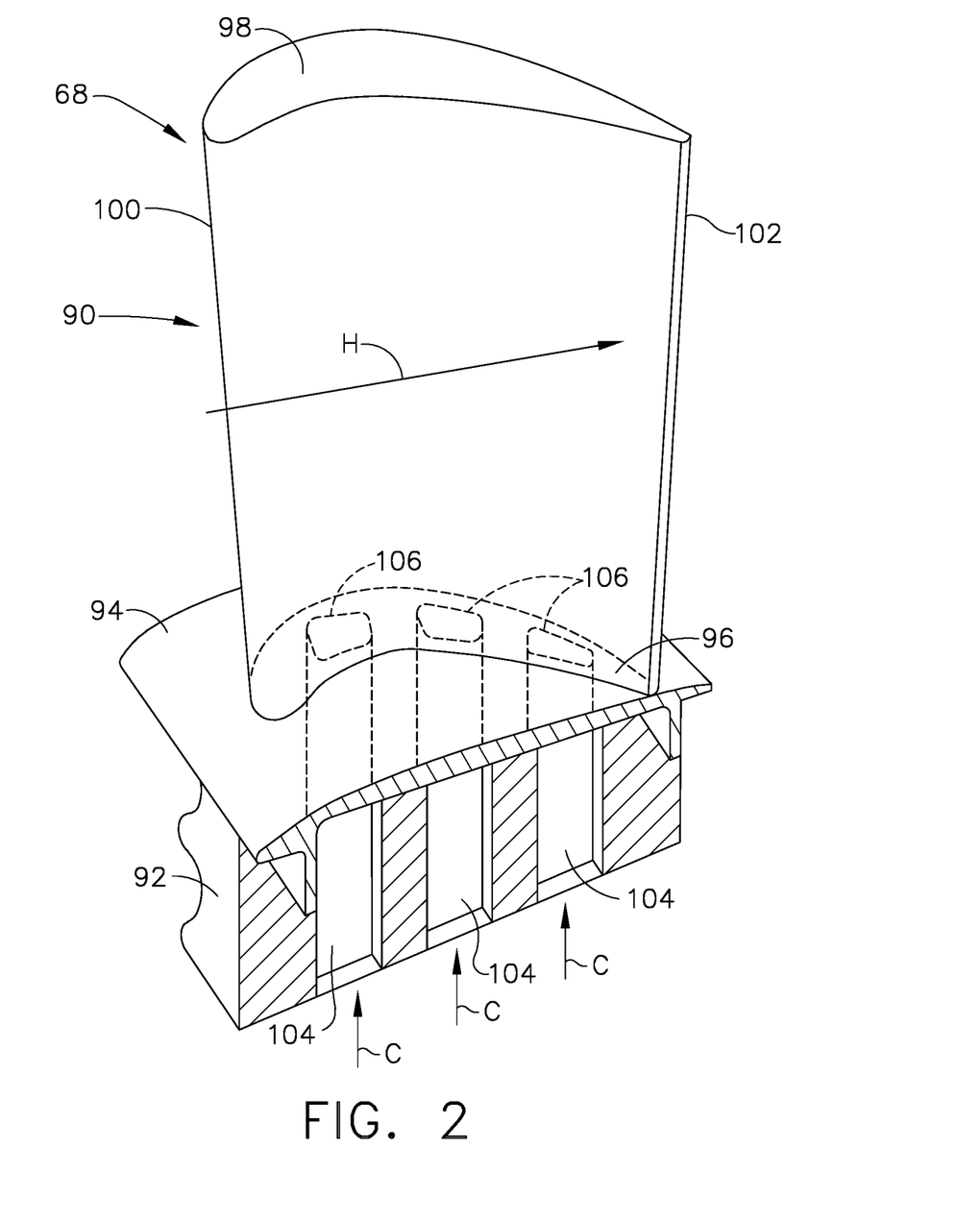
FIG. 2 is a perspective view of an airfoil of the turbine engine of FIG. 1.

Referring now to FIG. 2, an engine component is shown in the form of an airfoil 90, which can be one of the turbine blades 68 of the engine 10 of FIG. 1 for example. Alternatively, the engine component can include a vane, a shroud, or a combustion liner in non-limiting examples, or any other engine component that can require or utilize cooling. The airfoil 90 includes a dovetail 92 and a platform 94. The airfoil 90 extends radially between a root 96 and a tip 98 defining a span-wise direction. The airfoil 90 extends axially between a leading edge 100 and a trailing edge 102 defining a chord-wise direction. The dovetail 92 can be integral with the platform 94, which can couple to the airfoil 90 at the root 96. The dovetail 92 can be configured to mount to a turbine rotor disk on the engine 10. The platform 94 helps to radially contain the turbine airflow. The dovetail 92 comprises at least one inlet passage 104, shown as three exemplary inlet passages 104, each extending through the dovetail 92 in fluid communication with the airfoil 90 at a passage outlet 106. It should be appreciated that the dovetail 92 is shown in cross-section, such that the inlet passages 104 are housed within the dovetail 92.

Figure 3:
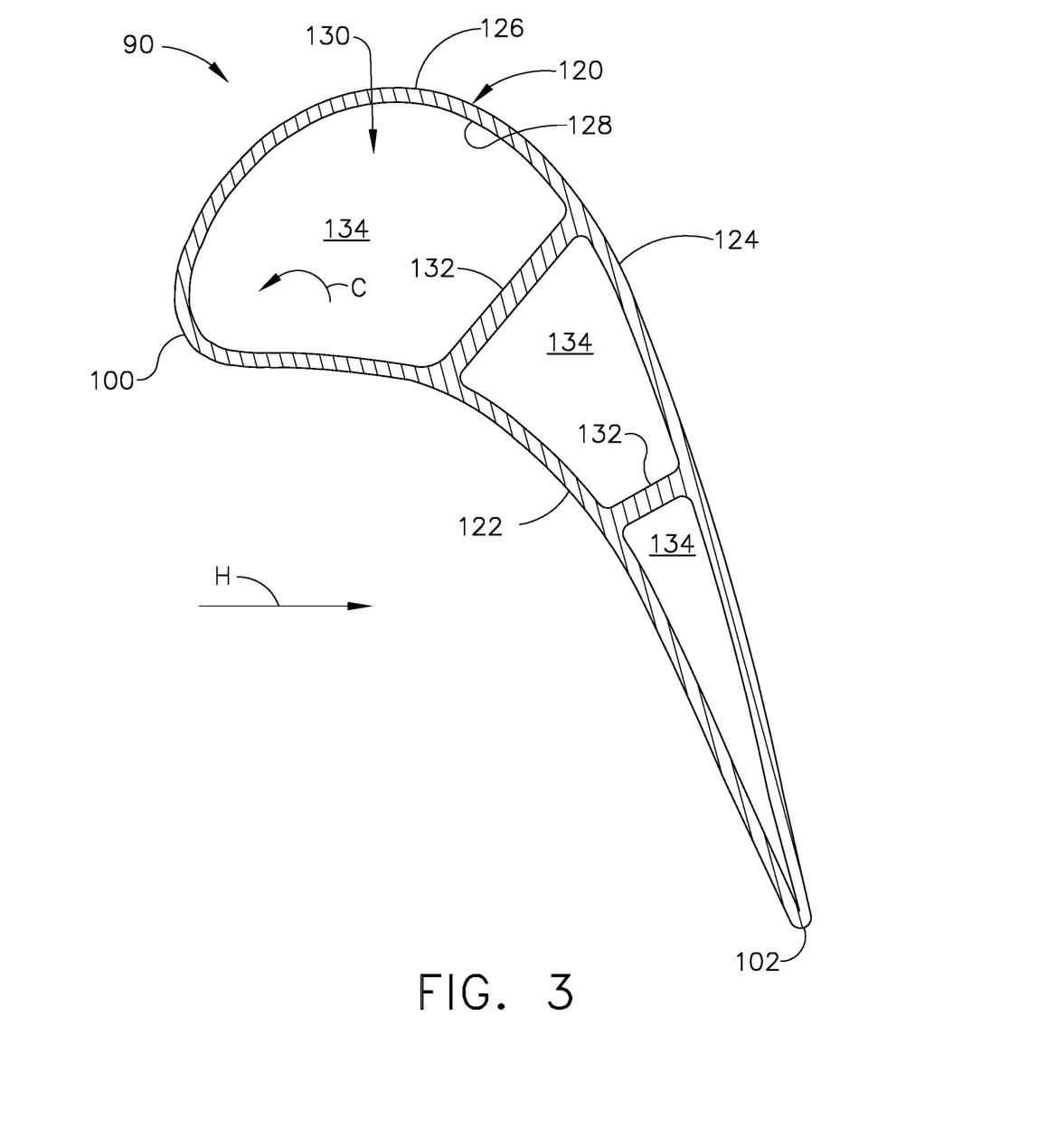
FIG. 3 is a cross-sectional view of the airfoil of FIG. 2 illustrating a wall with ribs defining passages within an interior of the airfoil.

Referring now to FIG. 3, a cross-sectional view of the airfoil 90 illustrates a wall 120 including a pressure side 122 and a suction side 124 extending between the leading edge 100 and the trailing edge 102. The wall 120 separates the hot fluid flow H external of the airfoil 90 from the cooling fluid flow C within the airfoil 90, having a hot surface 126 along the exterior of the airfoil 90 and a cooling surface 128 confronting the cooling fluid flow C. An interior 130 of the airfoil 90 is defined by the wall 120. One or more internal ribs 132 separates the interior 126 into cooling passages 134 extending in the span-wise direction. The passages 134 can define one or more cooling circuits throughout the airfoil 90. Additionally, the cooling circuits can be further includes micro-circuits, sub-circuits, near wall cooling circuits, leading edge passages, trailing edge passages, pin fins, pin banks, additional passages 134, flow augmentation structures such as turbulators, or any other structures which can define the cooling circuits.

Figure 4:
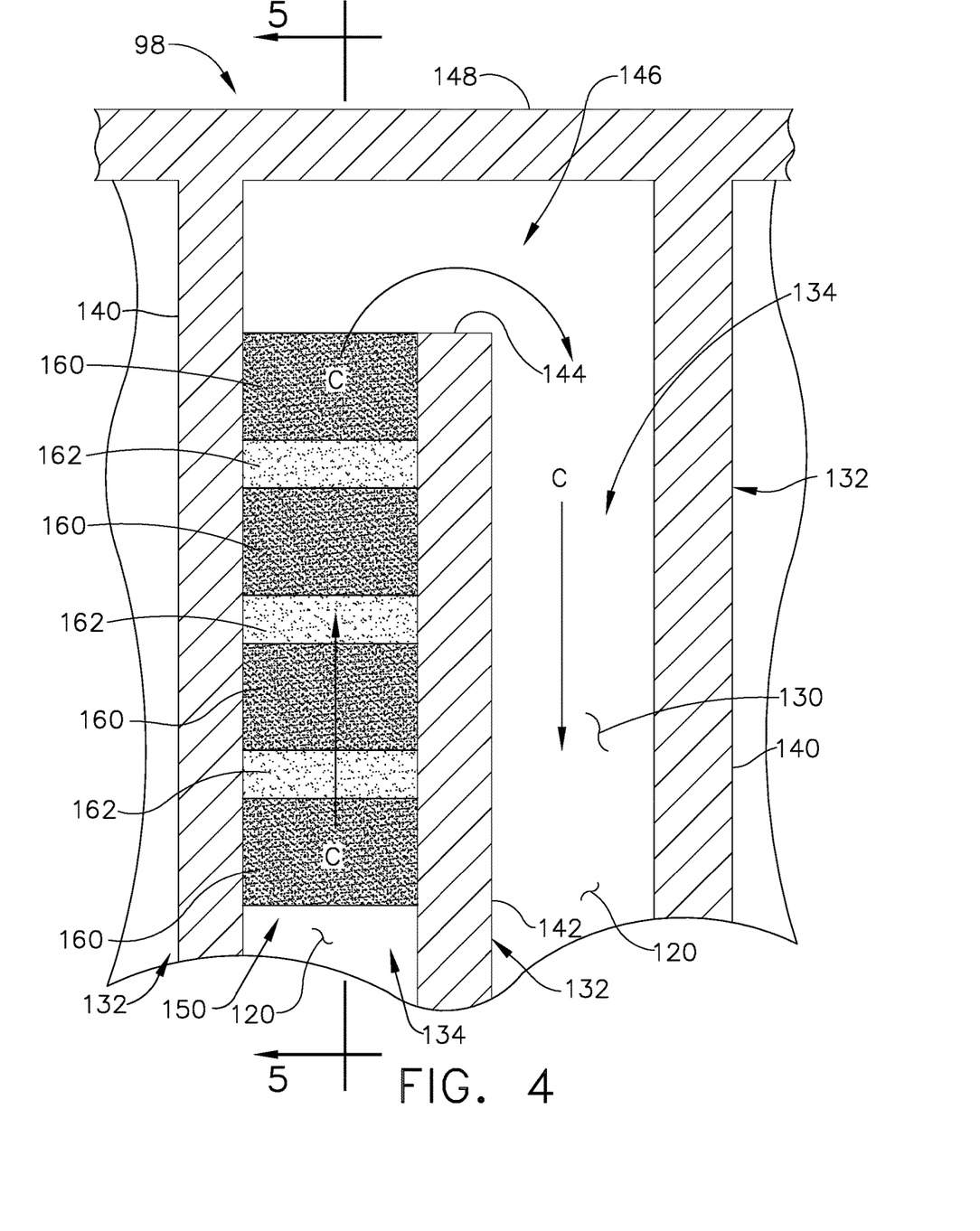
FIG. 4 is a section view of an exemplary interior of the airfoil of FIG. 3 illustrating a cooling circuit within the interior defined by the ribs, with multiple flow augmentation structures along a porous section of the wall.

Referring to FIG. 4, a section view of the airfoil 90 illustrates a system of ribs 132 extending in the span-wise direction. The ribs 132 are separated into first ribs and second ribs, illustrated as full-length ribs 140 and partial length ribs 142, respectively. The full-length ribs 140 extend fully in the span-wise direction between the root 96 and the tip 98. The partial-length ribs 142 extend only partially between the root 96 and the tip 98. As shown, the partial-length rib 142 terminates at a rib tip 144 prior to the tip 98. In another example, the partial-length rib 142 can terminate prior to the root 96.

The ribs 132 can define the passages 134 extending in the span-wise direction. A tip turn 146 can fluidly couple adjacent passages at the tip 98. A tip cap 148 can form the terminal end of the passages and partially define the tip turn 146. The coupled passages 134 can at least partially define a cooling circuit 150 extending through the airfoil 90. It should be understood that the cooling circuit 150 as illustrated is exemplary, and can include additional structures to form the cooling circuit 150, such as micro-circuits, sub-circuits, near wall cooling circuits, leading edge passages, trailing edge passages, pin fins, pin banks, additional passages 134, or flow enhancers such as turbulators in non-limiting examples.

It should be appreciated that while the ribs 132 are illustrated as extending in the substantially span-wise direction, defining substantially span-wise extending passages 134, the ribs 132 can be organized in any direction, such as axial, radial, span-wise, chord-wise, or any combination thereof in non-limiting examples. As such, the passages or any portion of the cooling circuit 150 defined by the passages 134 can extend in any three-dimensional direction.

A porous section 160 can be form a portion of the wall 120. The porous section 160 can partially form the wall 120, the passage 134, and the cooling circuit 150. The porous section can be inserted into the wall 120, or formed into the wall 120, as well as integral with the wall 120. The porous section 160 can be aligned with the rib tip 144, terminate prior to the rib tip 144, or extend into the tip turn 146. The porous section 160 can extend fully between adjacent ribs 132, such as between the full-length rib 140 and the partial-length rib 142, or partially between the adjacent ribs 132. Additionally, the porous section 160 can only form a discrete portion of the wall 120, having a unique shape based upon the particular cooling needs of the airfoil 90 or the engine component. At least one flow augmentation structure 162 can be formed on the wall 120. The porous section 160 can be formed at the flow augmentation structures 162, or the flow augmentation structures 162 can be formed at the porous section 160. As such it should be understood that the flow augmentation structures 162 can be formed based upon the needs of the airfoil 90, having the porous section 160 formed based upon the flow augmentation structures 162. Additionally, the porous section 160 can be formed based upon the needs of the airfoil 90, having the flow augmentation structures formed based upon the porous section 160. While only three flow augmentation structures 162 are shown, the airfoil 90 can include any number of flow augmentation structures 162, being one or more. The flow augmentation structures 162 can be one or more of a turbulator, fastback turbulator, pin fins, pin bank, vortex generator, or chevron in non-limiting examples. The flow augmentations structures 162 can be any structure to affect the flow of cooling fluid C such that the flow varies from the streamline flow through the cooling circuit 150.

The porous section 160 and the flow augmentation structures 162 can be made of a porous material, while it should be appreciated that the flow augmentation structures 162 need not be made of a porous material. Furthermore, some flow augmentation structure 162 can have porous material while other may not. Working under the example where the flow augmentation structures 162 include porous material, the flow augmentation structures 162 can have a greater porosity than the porous section 160. The porosity of the flow augmentation structures 162, in one example, can be at last twice that of the porous section 160. As such, a greater flow rate of fluid can pass through the flow augmentation structures to enhance turbulence and improve cooling with such a turbulent flow. The porous material, in one non-limiting example, can be made by additive manufacturing, while it is contemplated that additive manufacturing can form the entire airfoil 90. It should be appreciated that any portion of the airfoil 90 can be made by any known method including but not limited to, casting, machining, additive manufacturing, coating, or otherwise. The porous material can define a porosity, being permeable by a volume of fluid, such as air. The porous material can have a particular porosity to meter the flow of a fluid passing through the porous material at a predetermined rate. It should be appreciated that additive manufacturing can be used to achieve a particular local porosity along the porous material, as well as a consistent porosity across the entirety of the porous material, as compared to traditional method of forming the porous material. In alternative examples, the porous material can be made of any of the materials described above, such that a porosity is defined. In one non-limiting example, the porous material can be made of Ni, NiCrAlY, NiAl, or similar materials. The porous material can further be made of a nickel foam, for example.

Additionally, the porous material can be a structured porous material or a random porous material, or any combination thereof. A structured porous material includes a determinative porosity throughout the material, which can have particular local increases or decreases in porosity to meter a flow of fluid passing through the structured porous material. Such local porosities can be determined and controlled during manufacture. Additive manufacturing can be used to form a structured porous material, in one non-limiting example. Alternatively, the porous material can have a random porosity. The random porosity can be adapted to have a porosity as the average porosity over an area of the porous material, having discrete variable porosities that are random. A random porous material can be made from a nickel foam, in one non-limiting example.

Figure 5:
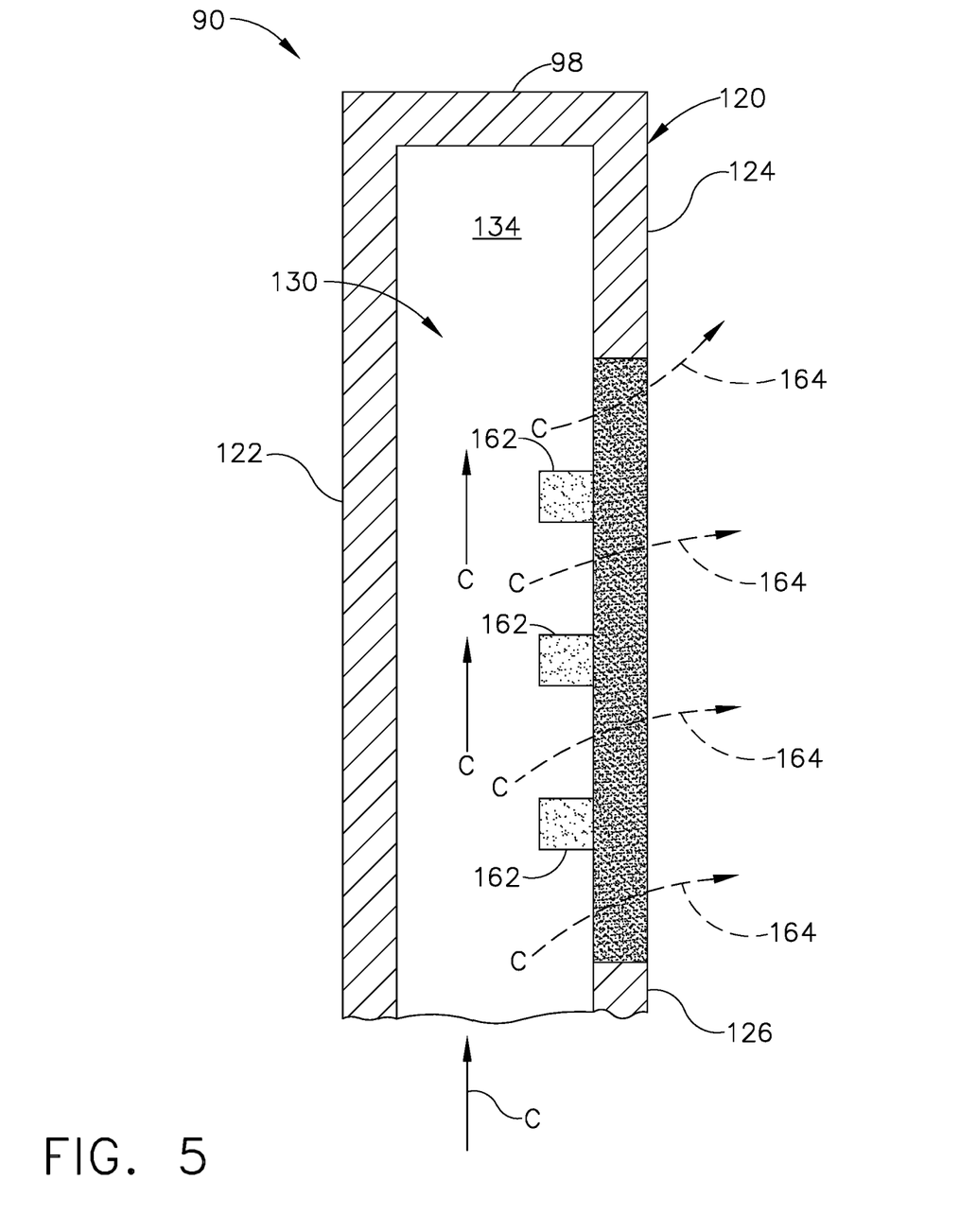
FIG. 5 is a cross-sectional view along section 5-5 of FIG. 4, illustrating the profile of the flow augmentation structures along a porous section.

The flow of cooling fluid C can be provided to the cooling circuit 150 from the inlet passage 104 in the dovetail 92 (FIG. 2). The flow of cooling fluid C can pass through the serpentine path of the cooling circuit 150. The flow cooling fluid C turns within the tip turn 146. The flow of cooling fluid C can be augmented by the flow augmentation structures 162. Additionally, a portion of the flow of cooling fluid C can pass through the porous section 160. Referring now to FIG. 5, taken across section 5-5 of FIG. 4, the porous section 160 can extend fully through the wall 120 on the suction side 124. It should be appreciated that while the porous section 160 and flow augmentation structures 162 are illustrated on the suction side 124 of the airfoil 90, they can also be place along the pressure side 122, or a combination of both sides 122, 124.

The cooling fluid flow C can pass through the porous section 160 as a first exhaust flow 164, such as for providing a film of cooling fluid along the hot surface 126 of the airfoil 90.

The flow augmentation structures 162 can affect the cooling fluid flow C, such as generating turbulence to improve cooling effectiveness. Such flow augmentation structures can include turbulators, fastback turbulators, pin fins, pin banks, vortex generators, or chevrons in non-limiting examples. Additionally, the flow augmentation structures 162 can be made of the porous material, such that the cooling fluid flow C can pass through the porous material of the flow augmentation structures 162, such as continuing along the cooling circuit 150 or passing into the porous section 160 for exhausting as the first exhaust flow 164.

As such, the porous material for the flow augmentation structures 162 and the porous section 160 can provide for improved airfoil cooling as well as reduced airfoil weight. The inclusion of the porous section 160 at the flow augmentation structures 162 can provide for reduction of flow stagnation points at the flow augmentation structures 162, increasing cooling efficiency, which can require lower cooling flow rates to improve engine efficiency. Additionally, the incidence of flow separation at the flow augmentation structures 162 can be reduced.

Figure 6:
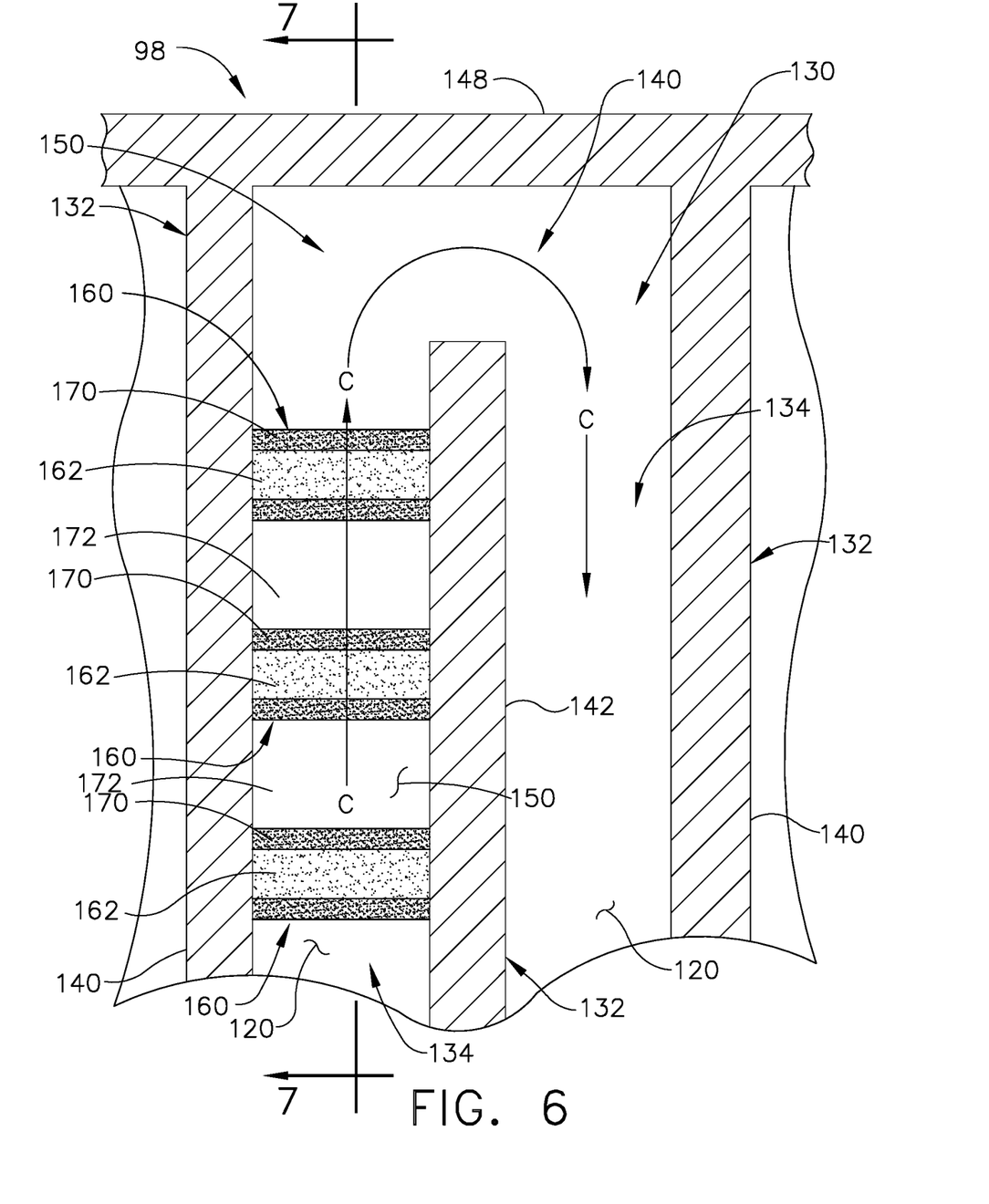
FIG. 6 is a cross-sectional view of another exemplary interior of the airfoil of FIG. 3 having multiple flow augmentation structures along multiple porous sections of the wall.

Referring now to FIG. 6, the porous section 160 can include multiple discrete porous sections 170 to define the porous section 160, including solid portions 172 of the wall 120 between the discrete porous sections 170. As such, the porous section 160 can be separated into discrete sections along the wall 120 or the cooling circuit 150. While the porous section 160 is shown as having three discrete porous sections 170, having generally rectilinear geometries, it should be appreciated that there can be any number of discrete porous sections, from one porous section 160 to two or more discrete porous sections 170 to form the porous section of the wall 120, having any such geometry such as rectilinear, curvilinear, unique, geometric, or otherwise in non-limiting examples.

Each discrete porous section 170 can include one flow augmentation structure 162. The flow augmentation structure 162 can be wholly or partially disposed on the porous sections 170, such as being radially centered on the porous section 170 in one non-limiting example. In alternative examples. The flow augmentation structure 162 can be offset from the center of the porous section 170, or only partially located on the porous section 170.

Figure 7:
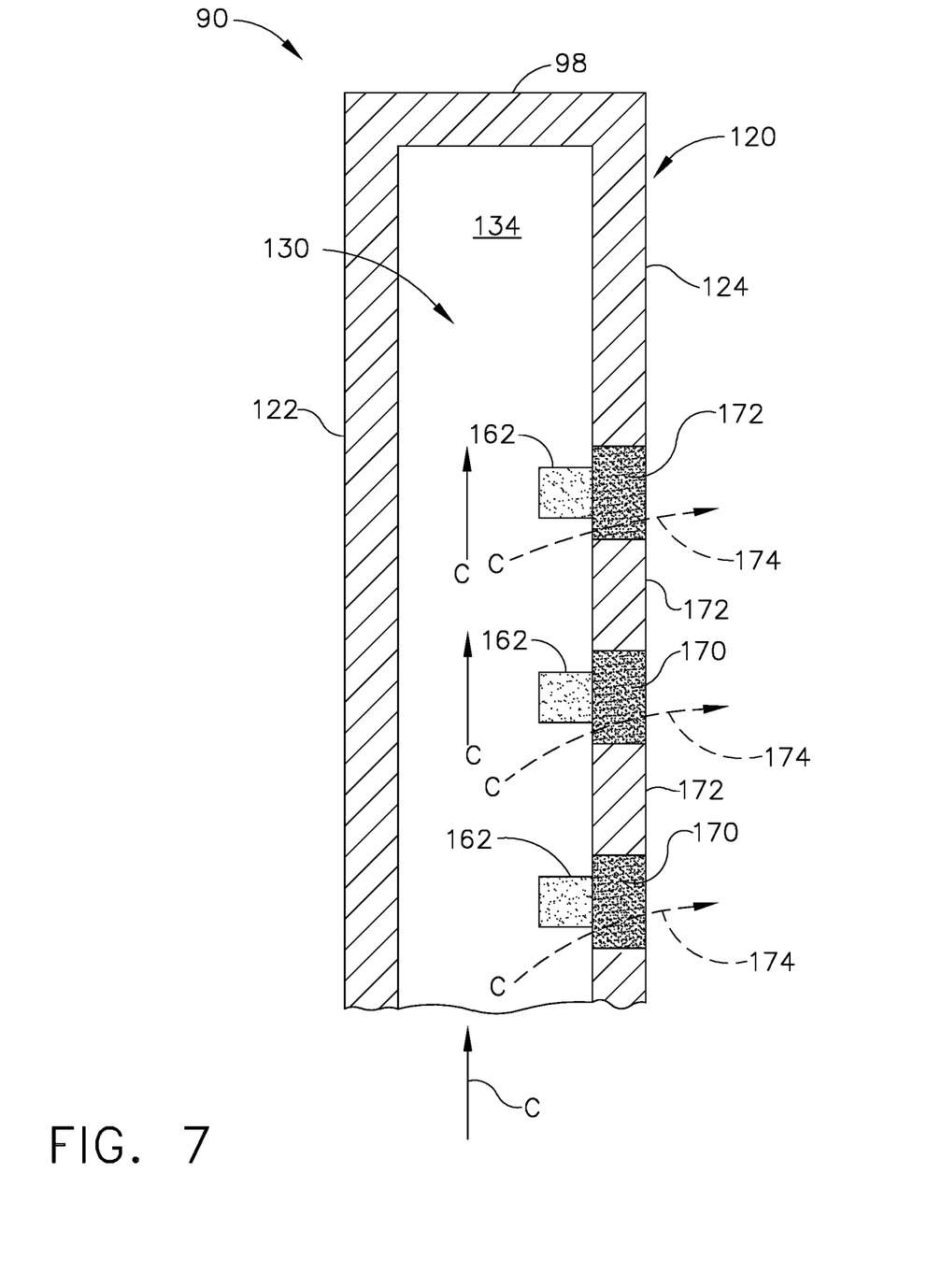
FIG. 7 is a cross-sectional view along section 7-7 of FIG. 6, illustrating the profile of the flow augmentation structures along the porous sections.

Referring now to FIG. 7, illustrating section 7-7 of FIG. 6, the flow augmentation structures 162 are radially centered at the discrete porous sections 170. The flow of cooling fluid can pass through the discrete porous portions 170 in the wall 120 to external of the airfoil 90 as a second exhaust flow 174. The solid portions 172 provide for directionality of the cooling fluid flow C to particular portions of the wall 120 before being exhausted as well as providing for metering of the second exhaust flow 174.

Figure 8:
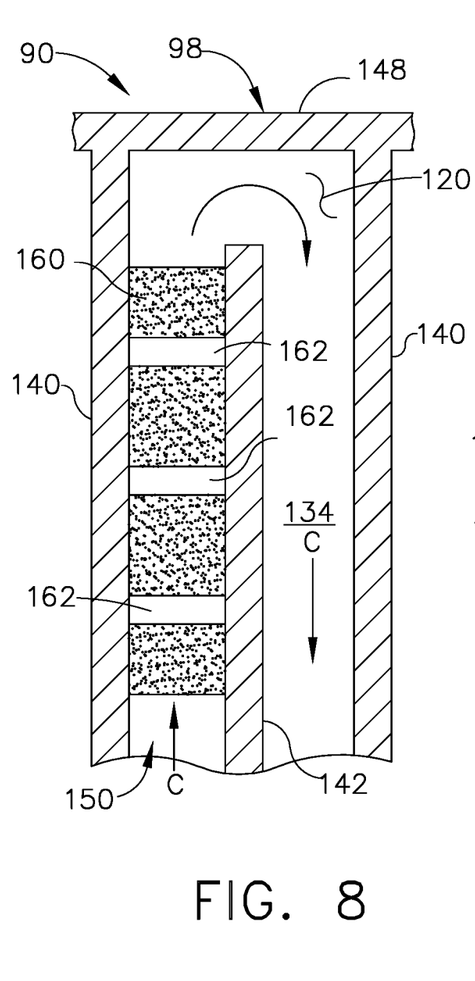
FIG. 8 is a cross-sectional view of yet another exemplary interior of the airfoil of FIG. 3 having multiple solid flow augmentation structure along a porous section.
Figure 9:
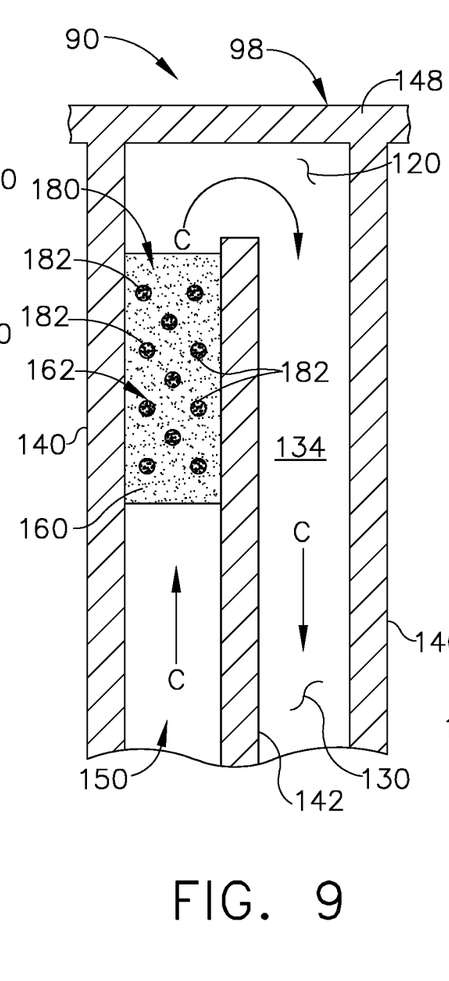
FIG. 9 is a cross-sectional view of yet another exemplary interior of the airfoil of FIG. 3 illustrating pins as flow augmentation structures along a porous section.
Figure 10:
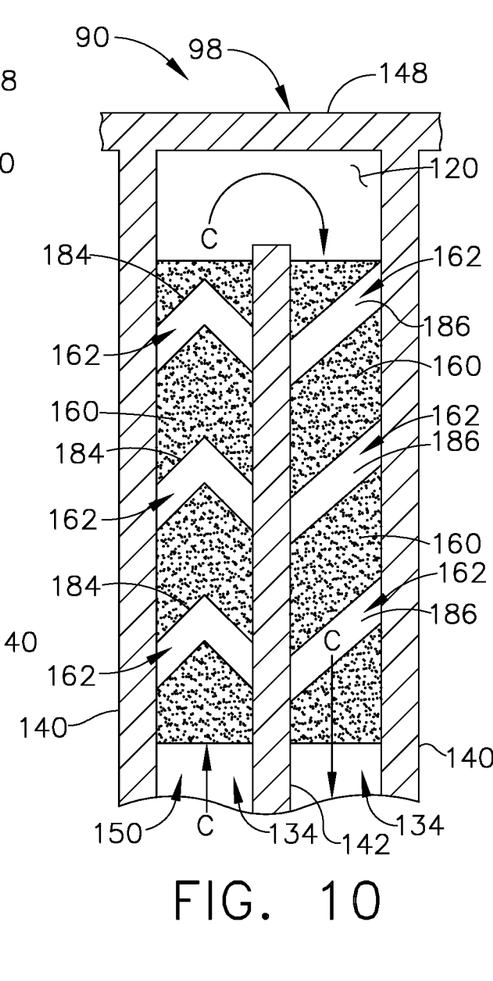
FIG. 10 is a cross-sectional view of yet another exemplary interior of the airfoil of FIG. 3 illustrating chevrons and angled turbulators as flow augmentation structures along two porous sections.

Referring now to FIGS. 8-10, alternative examples of the porous section with the flow augmentation structures are illustrated. The examples shown in FIGS. 8-10 are substantially similar to that of FIGS. 4-7. As such, similar numerals will be used to describe similar elements, while reasonable variation thereof is contemplated between examples.

Turning now to FIG. 8, the flow augmentation structures 162 can be non-porous, solid elements. As such, the flow augmentation structures 162 can be used to improve the cooling provided by the porous section 160 or the porous section 160 can be used to improve the effectiveness of the flow augmentation structures 162 by reducing the instance of flow stagnation or heat aggregation at the flow augmentation structures 162.

Referring now to FIG. 9, the flow augmentation structures 162 can include a pin bank 180 having a plurality of pins 182 forming the pin bank 180 disposed within the porous section 160. Some or all of the pins 182 can be made of a porous material having a porosity to permit a volume of the flow of cooling fluid C to pass through the pins 182. The porosity of the pins 182 can be greater than that of the porous section 160. The porous section 160 having the pin bank 180, as well as having pins 182 made of a porous material can improve cooling efficiency of the cooling circuit 150 as well as reducing the required volume of cooling fluid that can increase engine efficiency.

While the pin bank 180 is illustrated having a particular number or set of pins 182, arranged in three radial rows, it should be appreciated that the pin bank 180 can include any number of pins 182 in any organization, having some or all of the pins 182 located at the porous section 160.

Referring now to FIG. 10, the cooling circuit 150 can include more than one passage 134 with the porous section 160. Any passage 134, or wall 120, or equivalent thereof, can include a porous section 160 including flow augmentation structures 162 to at least partially form the cooling circuit 150. The flow augmentation structures 162 can be chevrons 184, or angled turbulators 186, as illustrated on the left and right sides of FIG. 10, respectively.

It should be understood that FIGS. 4-10 are exemplary, and that any airfoil 90 having a cooling circuit 150 can include one or more of the elements illustrated in FIGS. 4-10, or any combination thereof having a porous section 160 and at least one flow augmentation structure 162.

A method of cooling an airfoil for a turbine engine can include: (1) passing a flow of cooling fluid into a cooling circuit within the airfoil; (2) augmenting the flow of cooling fluid with at least one flow augmentation structure; and (3) exhausting at least a portion of the cooling fluid flow through a porous section in a wall of the airfoil adjacent the at least one flow augmentation structure.

Passing a flow of cooling fluid into the cooling circuit within the airfoil can include providing the cooling fluid flow C into the cooling circuit 150 through the inlet passages 104 in the dovetail 92 adjacent the airfoil 90. Augmenting the flow of cooling fluid C can be accomplished with the flow augmentation structures 162, such as the pin bank 180, the chevrons 184, or the angled turbulators 186 in non-limiting examples. Augmenting the flow of cooling fluid C can include increasing the effectiveness of the cooling flow C passing within the cooling circuit 150 to internally cool the airfoil 90, or can include directing the cooling fluid through the porous sections 160, 170 to improve film cooling along the exterior of the airfoil 90 or to reduce the incidence of flow separation at the flow augmentation structures 162. Exhausting at least a portion of the cooling fluid flow C can be passed through the porous section 160, such as through multiple discrete porous sections 170 in one example, adjacent to the at least one flow augmentation structure 162.

The method can further include metering the flow of cooling fluid through the porous section with a structured porosity. For example, the porous section 160 can be formed by additive manufacturing, defining a structured porosity for the porous section 160 having discrete or local porosities defined throughout the porous section 160. Such discrete or local porosities can be used to meter the flow of cooling fluid passing through the porous section 160. Similarly, the average porosity of the porous section 160 having a random porosity can be used to meter the cooling flow C passing through the porous section 160. Additionally, the structure or position of the flow augmentation structure 162 can be used to meter the flow of cooling fluid C through the porous section 160.

The method can further include passing at least a portion of the cooling fluid flow C through the flow augmentation structure, such that the flow augmentation structure is at least partially made of a porous material, such as that of FIG. 4. As such, at least a portion of the cooling fluid flow C can pass through the flow augmentation structure 162.

It should be appreciated that such a method can improve cooling efficiency of the airfoil 90. For example, the cooling fluid C can be provided to the hot surface 126 over a large area of the airfoil wall 120, as opposed to requiring a higher flow pressure passing through film holes to provide film cooling over the hot surface 126. Additionally, the combined porous section 160 as well as the flow augmentation structures 162 can provide for improved cooling of the airfoil 90. The porous section 160 can reduce the incidence of flow stagnation at the flow augmentation structures 162, while reducing overall heat aggregation. The flow augmentation structures 162 can provide for improved directionality for providing the cooling fluid flow C through the porous section 160. Additionally, the use of porous materials can decrease system weight while minimizing heat aggregation and maintaining structural integrity of the component.

It should be appreciated that while the description is directed toward an airfoil, the concepts as described herein can have equal applicability in additional engine components, such as a vane, shroud, or combustion liner in non-limiting examples, and the porous section with flow augmentation structures within the passage of the airfoil can be any similar region of any engine component having a cooling circuit, or an interior cooling surface with a wall separating the hot gas flow H and requiring cooling, such as regions typically requiring film cooling holes or multi-bore cooling.

It should be further appreciated that the porous section and flow augmentation structures including the porous material can provide for improved engine component cooling and film cooling, such as providing improved directionality, metering, or local flow rates. Additionally, the porous material include in the region and the film holes can further improve the film cooling to an entire region beyond just the areas local to the film holes. Additionally, system weight can be minimized while maintaining overall structural integrity.

It should be appreciated that application of the disclosed design is not limited to turbine engines with fan and booster sections, but is applicable to turbojets and turbo engines as well, or any other engine requiring fluid cooling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
   a wall defining a pressure side and a suction side extending axially between a leading edge and a trailing edge defining a chord-wise direction and extending radially between a root and a tip defining a span-wise direction, and defining an interior having a cooling surface facing the interior;
   a cooling circuit located within the airfoil for providing a cooling fluid flow and having a cooling passage extending in the span-wise direction;
   at least one flow augmentation structure disposed along the cooling passage to augment the cooling fluid flow, the at least one flow augmentation structure is made of a porous material; and
   at least one porous section defined within the wall along the cooling passage at the at least one flow augmentation structure and wherein the at least one flow augmentation structure includes a porosity greater than the porosity of the at least one porous section.

2. The airfoil of claim 1 the at least one flow augmentation structure includes a plurality of flow augmentation structures.

3. The airfoil of claim 2 wherein the porous section spans the plurality of flow augmentation structures.

4. The airfoil of claim 3 wherein the plurality of flow augmentation structures are all made of a porous material.

5. The airfoil of claim 2 wherein the at least one porous section includes multiple porous sections complementary to the plurality of flow augmentation structures.

6. The airfoil of claim 5 wherein the plurality of flow augmentation structures are all made of a porous material.

7. The airfoil of claim 1 wherein the at least one flow augmentation structure and the porous section have a structured porosity.

8. The airfoil of claim 1 wherein the flow augmentation structure is at least one of a turbulator, fastback turbulator, pin fins, pin bank, vortex generator, or chevron.

9. The airfoil of claim 1 wherein the airfoil is made by additive manufacturing.

10. A component for a turbine engine, which generates a hot gas flow and provides a cooling fluid flow, the component comprising:
    a wall separating the hot gas flow and cooling fluid flow, and having a hot surface along with the hot gas flow and a cooling surface facing the cooling fluid flow;
    a cooling circuit located within the component and having a cooling passage defined at least partially by the wall and forming at least a portion of the cooling circuit;
    at least one flow augmentation structure, made of a porous material, disposed along the cooling passage to augment the cooling fluid flow passing through the cooling circuit; and
    at least one porous section defined within the wall along the cooling passage at the at least one flow augmentation structure and wherein the at least one flow augmentation structure includes a porosity greater than the porosity of the at least one porous section.

11. The component of claim 10 wherein the at least one flow augmentation structure includes a plurality of flow augmentation structures.

12. The component of claim 11 wherein the porous section spans the plurality of flow augmentation structures.

13. The component of claim 11 wherein the at least one porous section includes multiple porous sections complementary to the plurality of flow augmentation structures.

14. The component of claim 13 wherein the plurality of flow augmentation structures are all made of a porous material.

15. The component of claim 10 wherein the at least one flow augmentation structure and the at least one porous section have a structured porosity.

16. The component of claim 10 wherein the component is made by additive manufacturing.

17. A method of cooling a component for a turbine engine as claimed in claim 10, the method comprising:
    passing a flow of cooling fluid into a cooling circuit within the component;
    turbulating the flow of cooling fluid by passing the flow of cooling fluid over at least one flow augmentation structure in the cooling circuit; and
    exhausting at least a portion of the cooling fluid flow through a porous section in a wall of the component adjacent the at least one flow augmentation structure.

18. The method of claim 17 further comprising metering the flow of cooling fluid through the porous section with a structured porosity for the porous section.

19. The method of claim 17 wherein augmenting the flow of cooling fluid with at least one flow augmentation structure includes passing at least a portion of the flow of cooling fluid through a porous portion of the flow augmentation structure.

* * * * *